United States Patent [19]

Yamamura et al.

[11] Patent Number: 5,240,888
[45] Date of Patent: Aug. 31, 1993

[54] INORGANIC FIBER AND PROCESS FOR THE PRODUCTION THEREOF

[75] Inventors: Takemi Yamamura; Toshihiro Ishikawa; Masaki Shibuya, all of Ube, Japan

[73] Assignee: Ube Industries, Ltd., Yamaguchi, Japan

[21] Appl. No.: 870,638

[22] Filed: Apr. 20, 1992

[30] Foreign Application Priority Data

Apr. 19, 1991 [JP] Japan .................................. 3-179070
Nov. 29, 1991 [JP] Japan .................................. 3-356091

[51] Int. Cl.$^5$ ...................... C04B 35/02; C04B 35/04
[52] U.S. Cl. ...................................... 501/95; 428/699
[58] Field of Search .................... 428/699; 501/95, 87, 501/88, 92, 99

[56] References Cited

U.S. PATENT DOCUMENTS

| | | | |
|---|---|---|---|
| 4,399,232 | 8/1983 | Yajima | 501/38 |
| 4,778,722 | 10/1988 | Yamamura et al. | 428/367 |
| 4,990,470 | 2/1991 | Yamamura et al. | 501/91 |

*Primary Examiner*—Mark L. Bell
*Assistant Examiner*—A. Wright
*Attorney, Agent, or Firm*—Wenderoth, Lind & Ponack

[57] ABSTRACT

An inorganic fiber having excellent properties as a reinforcement for metals, plastics and rubbers, which has a surface layer portion and an inner layer portion, the surface layer portion having a composition continuously changing from the inner layer portion to the fiber surface, and which is composed of a basic constituent unit of;

(1) an amorphous substance composed of silicon, carbon, either titanium or zirconium, and oxygen, (2) an aggregate composed of;

crystalline fine particles formed of at least one selected from the group consisting of $\beta$-SiC, MC, a solid solution of $\beta$-SiC and MC, and $MC_{1-x}$, and having a particle diameter of not more than 50 nm, amorphous $SiO_2$, and $MO_2$, or (3) a mixture of the above amorphous substance (1) with the above aggregate (2), wherein M is titanium or zirconium and x is greater than 0 and less than 1, the inorganic fiber having an inner layer portion comprising 40 to 60% by weight of silicon, 20 to 40% by weight of carbon, 0.5 to 10% by weight of titanium or zirconium and 10 to 30% by weight of oxygen, and a surface layer portion comprising 0 to 40% by weight of silicon, 50 to 100% by weight of carbon, 0 to 8% by weight of titanium or zirconium and 0 to 25% by weight of oxygen.

6 Claims, 4 Drawing Sheets

INORGANIC FIBER AND PROCESS FOR THE PRODUCTION THEREOF

FIELD OF THE INVENTION

The present invention relates to an inorganic fiber of which the surface layer-forming elements have a gradient composition distribution and which can be preferably used as a reinforcing fiber for a composite material, and a process for producing the same.

PRIOR ART

JP-B-60-1405 and JP-B-60-20485 disclose an inorganic fiber comprising silicon, carbon, either titanium or zirconium, and oxygen, which is obtained by spinning a fiber out of polytitanocarbosilane or polyzirconocarbosilane, rendering the fiber infusible, and pyrolyzing the infusible fiber. The above publications describe that this inorganic fiber has excellent wettability to metals or alloys and therefore can be used as a reinforcing fiber for metals, plastics and rubbers.

In recent years, a composite material reinforced with an inorganic fiber has been being increasingly required to endure use under severe environments, and therefore, even the above inorganic fiber is required to be surface-treated depending upon matrices such as metals, plastics and rubbers to meet with the above requirement.

For example, Ceramic Bulletin, No. 67. Vol. 11, 1988, pp. 1,779–1,782, describes that an LiO-Al$_2$O$_3$-SiO$_2$ glass ceramic reinforced with a silicon carbide fiber has a maximum flexural strength of about 90 kg/mm$^2$ at room temperature and a fracture toughness value of 15 MPa·m$^{\frac{1}{2}}$.

Journal of the Ceramic Society of Japan, Vol. 99, No. 1, 1991, pp. 89–93 (1991) discloses that a composite material comprising mullite and 40% by volume of silicon nitride whisker shows an improvement in flexural strength from about 35 kg/mm$^2$ to about 65 kg/mm$^2$ and an improvement in critical stress intensity factor (K$_{IC}$, also referred to as a fracture toughness value) from about 2 MPa·m$^{\frac{1}{2}}$ to about 4 MPa·m$^{\frac{1}{2}}$ as compared with a material formed of mullite alone.

Meanwhile, "Ceramics-Reinforced Ceramic Composites" issued by K.K. Sangyo Gijutsu Center, page 32, describes the main features which are required of ceramic materials for use in a gas turbine, e.g., a heat resistance temperature of 1,250° to 1,500° C., a minimum flexural strength of 40 to 60 kg/mm$^2$ or more and a critical stress intensity factor of 6.7 to 15 MPa·m$^{\frac{1}{2}}$. However, the above composite materials fail to satisfy these requirements.

With an increasing desire to improve the performance of a variety of heat engines including an automotive engine, it is strongly desired to develop a ceramic material which not only has excellent heat resistance but also has excellent strength and excellent fracture toughness in a temperature range of from room temperature to a high temperature.

SUMMARY OF THE INVENTION

It is an object of the present invention to provide an inorganic fiber having a surface layer portion and an inner layer portion, the surface layer portion having a composition which continuously changes from the inner layer portion to the fiber surface, and a process for producing the same.

It is another object of the present invention to provide an inorganic fiber having a surface layer portion and an inner layer portion and having excellent properties as a reinforcement for metals, plastics and rubbers, and a process for producing the same.

It is further another object of the present invention to provide an inorganic fiber having a surface layer portion and an inner layer portion and having excellent properties as a reinforcement for ceramics, and a process for producing the same.

According to the present invention, there is provided an inorganic fiber composed of a basic constituent unit of;

(1) an amorphous substance composed of silicon, carbon, either titanium or zirconium, and oxygen, (2) an aggregate composed of;
crystalline fine particles formed of at least one member selected from the group consisting of β-SiC, MC, a solid solution of β-SiC and MC, and MC$_{1-x}$, and having a particle diameter of not more than 50 nm,
amorphous SiO$_2$, and
MO$_2$, or (3) a mixture of the above amorphous substance (1) with the above aggregate (2), wherein M is titanium or zirconium and x is greater than 0 and less than 1, the inorganic fiber having an inner layer portion comprising 40 to 60% by weight of silicon, 20 to 40% by weight of carbon, 0.5 to 10% by weight of titanium or zirconium and 10 to 30% by weight of oxygen, and a surface layer portion comprising 0 to 40% by weight of silicon, 50 to 100% by weight of carbon, 0 to 8% by weight of titanium or zirconium and 0 to 25% by weight of oxygen.

DETAILED DESCRIPTION OF THE INVENTION

The inorganic fiber of the present invention is constituted of an inner layer portion and a surface layer portion, and generally has a diameter of 5 to 20 μm. The surface layer portion refers to a portion which is not more than 500 nm deep in the direction from the fiber surface to the fiber center and formed on the fiber surface side. When the surface layer portion is deeper than the above range, the proportion of the inner layer portion is relatively small. As a result, the resultant inorganic fiber shows degradation in mechanical properties.

Figure 1:
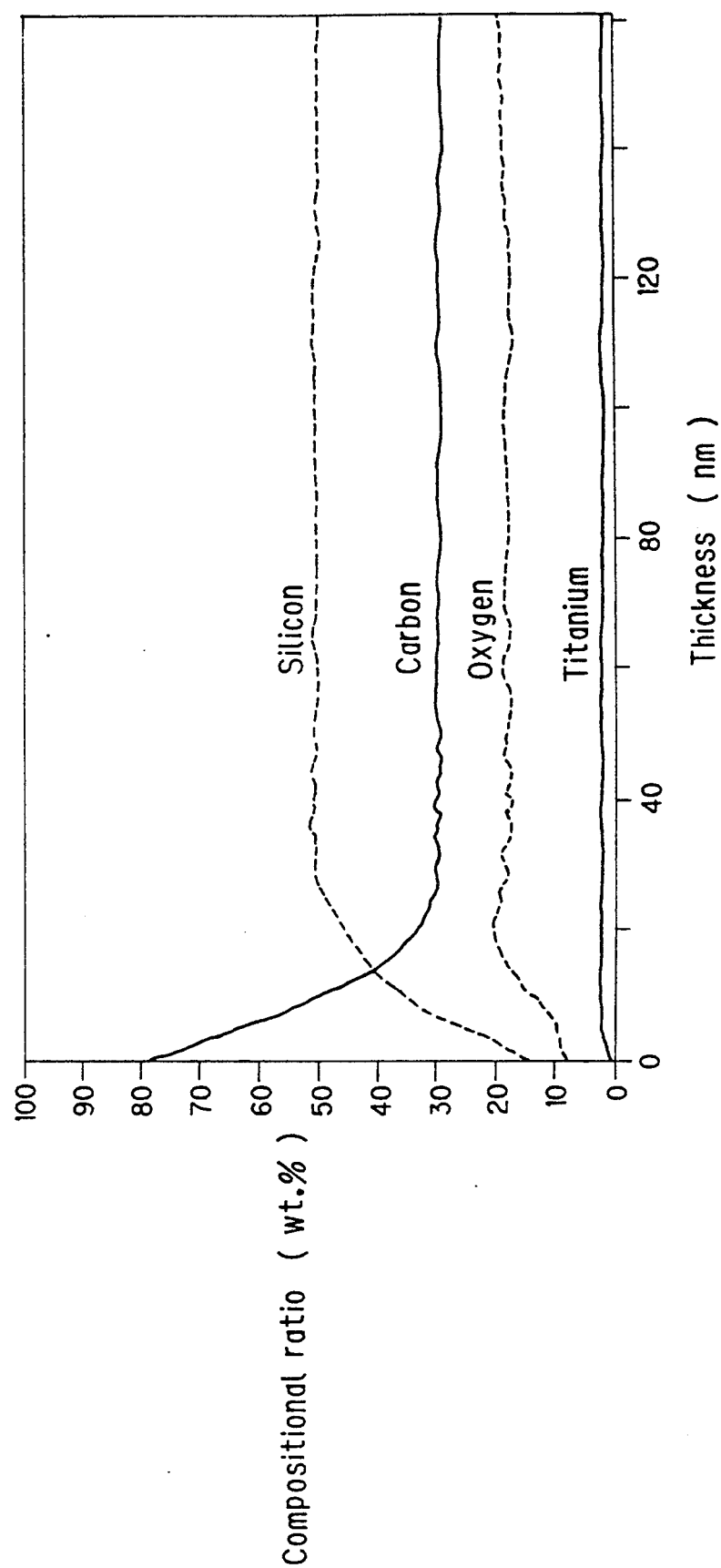
FIG. 1 shows the result of analysis of the composition of an inorganic fiber obtained in Example 1.
Figure 2:
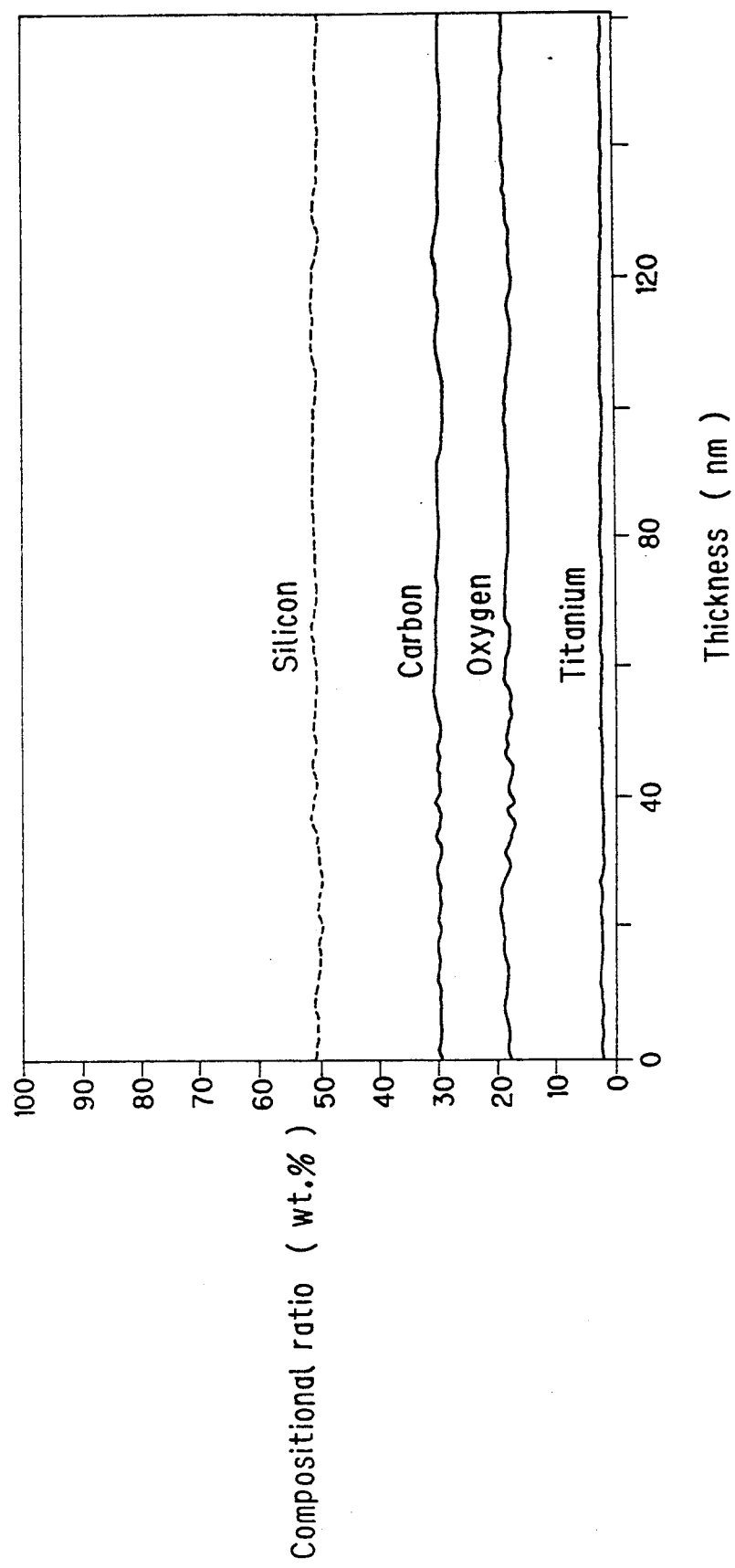
FIG. 2 shows the result of analysis of the composition of an inorganic fiber obtained in Comparative Example 1.

In the surface layer portion of the inorganic fiber of the present invention, the proportion of carbon continuously increases toward the fiber surface as shown, e.g., in FIG. 1. FIG. 1 shows the relationship between a depth (nm) from the fiber surface and proportions of constituent elements (wt. %) in an inorganic fiber obtained in Example 1 which will follow later. In FIG. 1, it is understood that the proportion of carbon sharply increases from a depth of about 20 nm to the fiber surface. Meanwhile, FIG. 2 shows the relationship between a depth from the fiber surface and proportions of constituent elements concerning an inorganic fiber obtained by a method described in JP-B-62-60414 in which a fiber is spun from a polytitanocarbosilane and rendered infusible and the infusible fiber is pyrolyzed at a constant temperature, which publication will be discussed later, it is understood that the proportions of constituent elements are nearly constant in the depth direction.

An increase of the carbon content toward the fiber surface, i.e., a gradient distribution of the carbon content in the surface layer portion imparts the inorganic fiber of the present invention with suitable bonding state to a variety of matrices, particularly ceramics.

One embodiment of a composite material formed from the inorganic fiber of the present invention and a ceramic as a matrix will be described hereinafter. The inorganic fiber of the present invention has a carbon-rich thin layer at the fiber surface. In the composite material, therefore, an interface layer formed of carbon, an interface layer formed of carbide, or an interface layer formed of carbon and carbide is formed between the fiber and the matrix. The presence of this interface layer not only inhibits an extreme reaction of the fiber with the matrix and decomposition of the fiber, but also maintains the interfacial bonding state of the fiber and matrix at an optimum state. As a result, the inorganic fiber-reinforced ceramic composite material exhibits excellent mechanical strength and high toughness in a temperature range from room temperature to a high temperature.

The form of the inorganic fiber for use is not specially limited. The fiber may have the form of a continuous fiber, a chopped short fiber prepared by cutting a long fiber, a plain weave, satin weave, multidirectional fiber preform, nonwoven fabric obtained from a continuous fiber, or a sheet-shaped fabric obtained by unidirectionally arranging a continuous fiber.

The inorganic fiber of the present invention will be described hereinafter.

The inorganic fiber of the present invention is produced from polytitanocarbosilane or polyzirconosilane (these two materials are generally referred to as "polymer precursor" hereinafter). The polymer precursor is prepared according to the method described in any one of JP-B-61-49335, JP-B-62-60414, JP-B-63-37139 and JP-B-63-49691. The description of each of these publications is taken as part of the present specification.

The polymer precursor includes:

(1) a polymer obtained by reacting polycarbosilane with either polytitanosiloxane or polyzirconosiloxane, in which a silicon atom of the polycarbosilane is bonded to a silicon atom, a titanium atom or a zirconium atom of the siloxane through an oxygen atom, and (2) a polymer obtained by reacting polycarbosilane with alkoxide of titanium or zirconium, in which a silicon atom of the polycarbosilane is bonded to a titanium atom or a zirconium atom through an oxygen atom.

According to the present invention, a fiber is spun from the polymer precursor and then rendered infusible. The fiber can be rendered infusible by a known method, e.g., a method in which the spun fiber is heated in an oxidative gas atmosphere at a temperature in the range of 50° to 400° C., or a method in which the spun fiber is irradiated with γ-ray or electron beam. The spinning from the above polymer precursor and the formation of the infusible fiber are described in JP-B-60-1405 and JP-B-60-20485 issued to the present applicant. The descriptions of these publications are taken as part of the present specification.

Then, the infusible fiber is continuously introduced to a continuous furnace to pyrolyze it. In the production process of the present invention, it is required to increase the pyrolysis temperature stepwise or continuously for the infusible fiber. This requirement is easily fulfilled, for example, by increasing the furnace temperature stepwise or continuously in the direction in which the fiber moves. Differing depending upon the amount of the introduced infusible fiber and the furnace length, the temperature gradient in the furnace cannot be determined uniformly. In general, however, the temperature gradient is in the range of 50° to 1,000° C. per meter of the furnace length.

The final pyrolysis temperature is in the range of 800° to 2,000° C., preferably in the range of 1,2000° to 1,600° C. The temperature in the furnace is increased in the direction in which the fiber moves as described above. The final pyrolysis temperature refers to a highest temperature attained in the pyrolysis furnace. When the final pyrolysis temperature is less than 800° C., it is difficult to obtain an inorganic fiber having high mechanical strength. When the final pyrolysis temperature exceeds 2,000° C., a resultant inorganic fiber shows a great decrease in strength due to rapid crystallization and evaporation of silicon carbides.

The entrance temperature in the furnace is set in the range of room temperature to 800° C., preferably in the range of 50° to 200° C. When the entrance temperature in the furnace is too high, it is difficult to form a sufficient temperature gradient in the furnace, and it is therefore difficult to obtain an inorganic fiber having a surface layer portion of which the composition is gradient. For example, an inorganic fiber having a surface layer portion which has a 100% carbon layer at the surface can be obtained by a method in which the furnace is separated into four zones in the furnace length direction and the temperatures of these zones are set at 500° C., 800° C., 1,300° C. and 1,600° C.

The infusible fiber is pyrolyzed under tension in an atmosphere of an inert gas such as nitrogen and argon or under vacuum. Although not specially limited, the tension to be applied to the infusible fiber is generally in the range of 10 to 300 g/mm$^2$.

According to the present invention, the above-described inorganic fiber having an inner layer portion and a surface layer portion can be effectively obtained. Although being not fully clear, the reason therefor is considered to be as follows. An inorganic fiber having a uniform composition is first formed. Then, from the inorganic fiber surface, silicon, either titanium or zirconium and oxygen are at least partly dissipated alone or as a compound. As a result, the surface layer has a greater proportion of carbon.

In the inorganic fiber of the present invention, the composition of the surface layer has a continuity from the composition of the inner layer, and there is no distinct interface therebetween. Therefore, no peeling occurs even when the inorganic fiber is subjected to a heat cycle. Therefore, when the inorganic fiber of the present invention is used as a reinforcement for a matrix material which is particularly suitable for the composition of the surface layer portion, e.g., ceramics, there can be obtained a composite material which is almost free from a decrease in strength caused by a heat cycle.

Examples of the ceramics include crystalline or amorphous oxide ceramics, crystalline or amorphous non-oxide ceramics, glass, glass ceramics, a mixture of these, and a particles dispersed strengthened ceramic of these ceramics.

Specific examples of the oxide ceramics include oxide ceramics of elements such as aluminum, magnesium, silicon, yttrium, indium, uranium, calcium, scandium, tantalum, niobium, neodymium, lanthanum, ruthenium, rhodium, beryllium, titanium, tin, strontium, barium, zirconium and iron, and solid solution of oxides of these metals.

Examples of the non-oxide ceramics include carbides, nitrides and borides.

Specific examples of the carbides include carbides of elements such as silicon, titanium, zirconium, aluminum, uranium, tungsten, tantalum, hafnium, boron, iron and manganese, and solid solution of carbides of these elements.

Specific examples of the nitrides include nitrides of silicon, boron, aluminum, magnesium and molybdenum, solid solution of nitrides of these elements, and SAIALON.

Specific examples of the boride include borides of titanium, yttrium and lanthanum and rare earth-platinum group-boride such as $CeCo_3B_2$, $CeCo_4B_4$ and $ErRh_3B_4$.

Specific examples of the glass include amorphous glass such as silicate glass, phosphate glass and borate glass. Specific examples of the glass ceramics include $LiO_2$-$Al_2O_3$-MgO-$SiO_2$ glass ceramic and $LiO_2$-$Al_2O_3$-MgO-$SiO_2$-$Nb_2O_5$ glass ceramic of which the main crystal phase is $\beta$-spodumene, MgO-$Al_2O_3$-$SiO_2$ glass ceramic of which the main crystal phase is cordierite, BaO-MgO-$Al_2O_3$-$SiO_2$ glass ceramic of which the main crystal phase is barium osumilite, BaO-$Al_2O_3$-$SiO_2$ glass ceramic of which the main crystal phase is mullite or hexacelsian, and CaO-$Al_2O_3$-$SiO_2$ glass ceramic of which the main crystal phase is anorthite. The crystal phase of the glass ceramics sometimes contains cristobalite.

Examples of the ceramics also include solid solutions of at least two of carbides, nitrides and oxides such as a titanium carbide-titanium nitride solid solution, a titanium carbide-titanium oxide solid solution and titanium nitride-titanium oxide solid solution.

Specific examples of the particle dispersed strengthened ceramics in which particles of these ceramics are dispersed for reinforcement include ceramics in which 0.1 to 60% by weight of spherical, polyhedral, plate-like or rod-like particles of an inorganic substance selected from silicon nitride, silicon carbide, zirconium oxide, magnesium oxide, potassium titanate, magnesium borate, zinc oxide, titanium boride and mullite are uniformly dispersed. The spherical particles and polyhedral particles generally have a diameter of 0.1 $\mu$m to 1 mm. The plate-like particles and rod-like particles generally have an aspect ratio of 1.5 to 1,000.

A ceramic composite material can be prepared by combining the inorganic fiber of the present invention and a ceramic material according to a known method and sintering them.

When the inorganic fiber is a chopped fiber, the chopped inorganic fiber may be mixed with a ceramic material powder to form a mixture. When the inorganic fiber is a long fiber, a woven fabric, an unwoven fabric or a sheet, layer(s) of the inorganic fiber and layer(s) of a ceramic material powder may be stacked alternately to form a laminate.

Then, at a time when, or after, the above mixture or laminate is shaped into a desired form, it is heated and sintered, whereby an inorganic fiber-reinforced ceramic composite material can be obtained.

The above mixture or laminate can be shaped as desired by any one of known methods such as a press molding method, a rubber pressing method, an extrusion molding method and a sheet molding method. A binder for the shaping may be selected from known polymers such as polyvinyl alcohol, a polymer of aluminum alkoxide, polycarbosilane and polymetalocarbosilane.

The sintering method is not specially limited, and may be selected from known methods such as a sintering method in which a shaped article is sintered under atmospheric pressure or reduced pressure, a hot pressing method in which the shaping and sintering are simultaneously carried out and a hot isostatic pressing method. The heating and sintering temperature is usually in the range of 400° to 2,200° C. When the heating and sintering temperature is too low, the sintering of the matrix does not fully proceed. When it is too high, the matrix or the inorganic fiber is liable to decompose.

The present invention will be detailed hereinafter by reference to Examples, in which "part" and "%" stand for "part by weight" and "% by weight" unless otherwise specified.

EXAMPLE 1

3 Parts of polyborosiloxane was added to 100 parts of polydimethylsilane synthesized by the dechlorination condensation of dimethyldichlorosilane with metal sodium, and the mixture was subjected to thermal condensation in nitrogen at 350° C. to obtain a polycarbosilane having a main chain skeleton composed mainly of carbosilane units of —Si—$CH_2$— and having hydrogen atoms and methyl groups bonding to silicon atoms of the carbosilane units. 20 Parts of titanium tetrabutoxide was added to 100 parts of the above polycarbosilane, and the resultant mixture was subjected to a crosslinking reaction at 340° C. in nitrogen to give a polytitanocarbosilane containing 100 parts of the above carbosilane units and 10 parts of titanoxane units of —Ti—O—.

The above-obtained polytitanocarbosilane was melt-spun into a polytitanocarbosilane fiber, and the fiber was heated in air at 190° C. to obtain an infusible fiber having a diameter of 15 $\mu$m.

A continuous furnace having a length of 8 m was separated into four zones, first, second, third and fourth zones, each of which has a length of 2 m, and the temperatures were set at 300° to 500° C. in the first zone, 500° to 800° C. in the second zone, 800° to 1,300° C. in the third zone and 1,300° to 1,600° C. in the fourth zone. Then, the above infusible fiber was continuously introduced into the furnace having the above temperature gradient, in the order of the first zone to the fourth, at a rate of 3 m/minute to pyrolyze the fiber in argon atmosphere. The resultant inorganic fiber was continuously taken out through an outlet of the fourth zone.

The above-obtained inorganic fiber had a diameter of 11 $\mu$m. The composition distribution of the inorganic fiber from the fiber surface to the central axis of the fiber was analyzed by a scanning Auger microprobe analysis, JAMP-30 supplied by Japan Electron Optics Laboratory, ltd. FIG. 1 shows the analysis result. As shown in FIG. 1, the inorganic fiber had an inner layer portion and a surface layer portion formed up to a depth of about 20 nm from the fiber surface. The proportions of elements constituting the inner layer portion were 51% of silicon, 29% of carbon, 18% of oxygen and 2% of titanium. In the surface layer portion, the proportion of carbon increased in the direction from the depth of about 20 nm to the fiber surface, up to 80% at the surface, while the proportions of silicon, oxygen and titanium gradually decreased.

The above inorganic fiber had a tensile strength of 330 kg/mm$^2$ and a tensile modulus (measured by a strand method) of 18 ton/mm$^2$.

EXAMPLE 2

Polyzirconocarbosilane was prepared in the same manner as in Example 1 except that the titanium tetrabutoxide was replaced with 30 parts of zirconium tetrabutoxide. The polyzirconocarbosilane was treated for spinning, formation of an infusible fiber and pyrolysis in the same manner as in Example 1 to give an inorganic fiber having a diameter of 12 μm.

The above inorganic fiber had an inner layer portion and a surface layer portion formed up to a depth of about 25 nm from the fiber surface. The proportions of elements constituting the inner layer portion were 53% of silicon, 28% of carbon, 17% of oxygen and 2% of zirconium. In the surface layer portion, the proportion of carbon increased up to 85% at the surface, while the proportions of silicon, oxygen and zirconium gradually decreased. The inorganic fiber had a tensile strength of 315 kg/mm$^2$ and a tensile modulus (measured by a strand method) of 18 ton/mm$^2$.

COMPARATIVE EXAMPLE 1

The same infusible fiber as that obtained in Example 1 was pyrolyzed at 1,300° C. in a furnace having no temperature gradient to give an inorganic fiber.

FIG. 2 shows the result of composition analysis of the above-obtained inorganic fiber in the direction from the fiber surface to the central axis of the fiber. As shown in FIG. 2, this inorganic fiber had a uniform composition as a whole, and the proportions of elements were 50% of silicon, 30% of carbon, 18% of oxygen and 2% of titanium. The inorganic fiber had a tensile strength of 335 kg/mm$^2$ and a tensile modulus (measured by a strand method) of 18 ton/mm$^2$.

REFERENTIAL EXAMPLE 1

Calcium carbonate, magnesium oxide and silicon dioxide were mixed in a weight ratio of 1:1:2, and the mixture was melted at a temperature of 1,000° to 1,500° C. Then, the melt was rapidly cooled in water to give a glass. The glass was milled to prepare a glass powder having a diameter of 3 μm or less. The inorganic fiber obtained in Example 1 was embedded in the glass powder, and the powder with the embedded inorganic fiber was hot-pressed in a graphite mold under a pressure of 200 kg/cm$^2$ at 1.300° C. for 1 hour to give a fiber-reinforced glass composite material having a fiber content of 20% by volume.

The above-obtained glass composite material had a flexural strength of 80 kg/mm$^2$. Further, when this glass composite material was subjected to a heat cycle test in which a cycle of rapid heating of the glass composite material in a furnace at 1,000° C. for 30 minutes and forcible rapid cooling thereof in air for 30 minutes was repeated five times, the above glass composite material retained a flexural strength of 72 kg/mm$^2$ (flexural strength retention ratio: 90%).

REFERENTIAL COMPARATIVE EXAMPLE 1

Referential Example 1 was repeated except for the use of the inorganic fiber obtained in Comparative Example 1. The so-obtained glass had a flexural strength of 20 kg/mm$^2$.

Further, when the above glass was subjected to the same heat cycle test as that described in Referential Example 1, the flexural strength decreased to 11 kg/mm$^2$ (flexural retention ratio: 55%).

REFERENTIAL EXAMPLE 2

$Y_2O_3$ and $Al_2O_3$ in an amount of 5% each were added to a silicon nitride powder having an average particle diameter of 0.8 μm, and 10% of polyvinyl alcohol as a binder was also added. Then, these components were mixed in a mixed solvent consisting of ethanol and distilled water with a ball mill for 48 hours to obtain a slurry of a matrix material.

A yarn (800 filaments) of the inorganic fiber obtained in Example 1 was pressed to a few Teflon cylindrical pins, and then opened to a width of about 1.5 cm by flowing air to it. The opened inorganic fiber was taken up around a drum and a unidirectional sheet of the inorganic fiber was prepared. This sheet was immersed in the above slurry of the matrix material and fully dried to give a prepreg sheet.

The above-obtained prepreg sheet was cut to square pieces having a size of 5 cm×5 cm, and the square pieces were stacked in a graphite die to which colloidal carbon as a die-releasing agent had been applied. Then, the resultant laminate was hot-pressed in an argon atmosphere at 1,000° C. at a pressure of 300 kg/cm$^2$. Boron nitride was applied to the so-obtained hot-press product, and a tantalum foil was wrapped around it. Then, the hot-press product was vacuum-closed in a capsule of Pyrex glass, and subjected to hot isostatic pressing at 1,700° C. at a pressure of 1,000 kg/cm$^2$ to obtain an inorganic fiber-reinforced ceramic composite material containing silicon nitride as a matrix. The proportion of the inorganic fiber in the composite material was 50% by volume.

Figure 3:
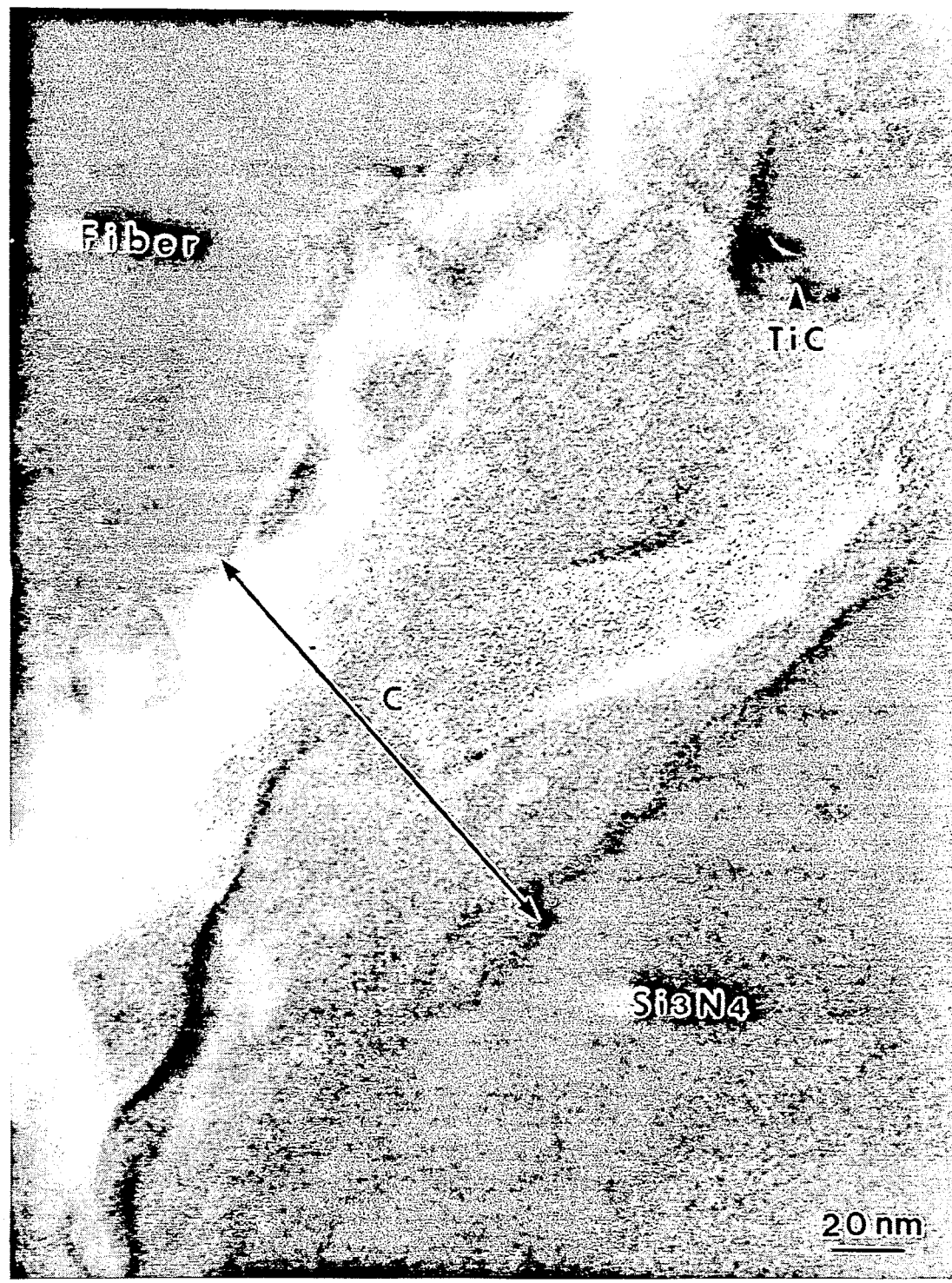
FIG. 3 shows the composite tissue of an interface between a fiber and a matrix in a composite material obtained in Referential Example 2, prepared by transmission electron microscopy and energy dispersive X-ray spectroscopy analysis.

The above-obtained composite material had a flexural strength, measured at room temperature, of 150 kg/mm$^2$, a flexural strength, measured at 1,400° C., of 100 kg/mm$^2$ and a fracture toughness value of 13.5 MPa·m$^{\frac{1}{2}}$, which value was about double of that of a monolithic silicon nitride. The fiber/matrix interfacial region of the composite material was observed through the analytical transmission electron microscopy to show that an interface layer of a mixture of carbon and carbide had been formed between the fiber and the matrix as shown in FIG. 3.

REFERENTIAL COMPARATIVE EXAMPLE 2

Referential Example 2 was repeated except that the inorganic fiber obtained in Example 1 was replaced with the inorganic fiber obtained in Comparative Example 1 to give a composite material containing silicon nitride as a matrix.

Figure 4:
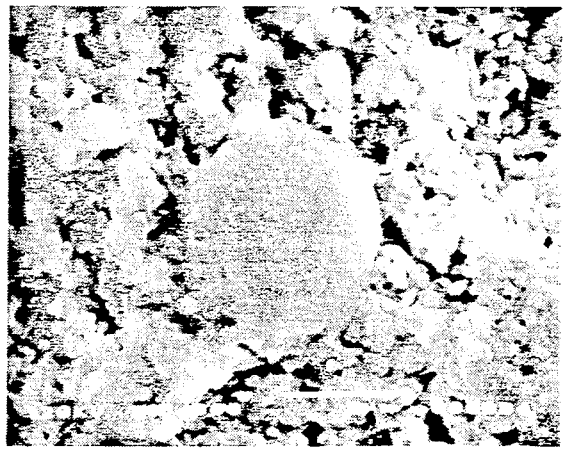
FIG. 4 shows the fracture surface of a composite material obtained in Referential Comparative Example 2, prepared by scanning electron microscopy.

The so-obtained composite material had a flexural strength, measured at room temperature, of 60 kg/mm$^2$ and a flexural strength, measured at 1,400° C., of 40 kg/mm$^2$. The fractured surface of this composite material was observed through the scanning electron microscopy to show that the fiber had so vigorously reacted with the matrix that the form of the fiber had been disintegrated as shown in FIG. 4.

REFERENTIAL EXAMPLE 3

Polyethylene oxide in an amount of 10% was added to an alumina powder having an average particle diameter of 0.4 μm, and then these components were mixed in a mixed solvent consisting of ethanol and water with a ball mill for 40 hours to prepare a slurry of a matrix material.

The above slurry of the matrix material was placed in a tank equipped with a bubbling device, and a yarn of the inorganic fiber obtained in Example 1 was immersed in the slurry. Then, under the operation of the bubbling device, the fiber was opened and at the same time the slurry of the matrix was allowed to attach the fiber surface. Thereafter, the fiber yarn was taken up around a drum and fully dried, and a prepreg sheet was prepared.

The above-obtained prepreg sheet was cut to square pieces having a size of 5 cm × 5 cm, and the square pieces were stacked in a graphite die to which colloidal carbon as a die-releasing agent had been applied. Then, the resultant laminate was hot-pressed in an argon atmosphere at 1,400° C. at a pressure of 500 kg/cm$^2$ to give an inorganic fiber-reinforced composite material containing alumina as a matrix. The proportion of the inorganic fiber in the composite material was 50% by volume.

The above-obtained composite material had a flexural strength, measured at room temperature, of 170 kg/mm$^2$, a flexural strength, measured at 1,300° C., of 100 kg/mm$^2$ and a fracture toughness value of 17.5 MPa·m$^{\frac{1}{2}}$, which value was about 5.5 times as large as that of monolithic alumina.

REFERENTIAL EXAMPLE 4

Referential Example 3 was repeated except that the inorganic fiber obtained in Example 1 was replaced with the inorganic fiber obtained in Example 2 to give an inorganic fiber-reinforced composite material containing alumina as a matrix.

The above-obtained composite material had a flexural strength, measured at room temperature, of 165 kg/mm$^2$, a flexural strength, measured at 1,300° C., of 105 kg/mm$^2$ and a fracture toughness value of 14 MPa·m$^{\frac{1}{2}}$.

REFERENTIAL EXAMPLE 5

Polyvinyl alcohol in an amount of 7% as a binder was added to a mullite powder having an average particle diameter of 1.5 μm, and these components were mixed in a mixed solvent consisting of ethanol and water with a ball mill for 45 hours to prepare a slurry of a matrix material.

Then, a prepreg sheet was produced in the same manner as in Referential Example 3, and the prepreg sheet was treated in the same manner as in Referential Example 3 to give an inorganic fiber-reinforced composite material containing mullite as a matrix. The proportion of the inorganic fiber in the composite material was 45% by weight.

The above-obtained composite material had a flexural strength, measured at room temperature, of 105 kg/mm$^2$, a flexural strength, measured at 1,400° C., of 80 kg/mm$^2$ and a fracture toughness value of 16 MPa·m$^{\frac{1}{2}}$, which value was about 6.5 times as large as that of monolithic mullite.

REFERENTIAL EXAMPLE 6

Magnesium oxide, aluminum oxide and silicon dioxide were mixed in a weight ratio of 4:10:15, and 8% of titanium oxide was further added. The resultant mixture was melted in air at about 1,600° C., and taken out into air at room temperature to prepare a glass. This glass was milled to particles having a size of 1 to 100μ to obtain a glass powder.

Polyethylene oxide in an amount of 10% as a binder was added to the above glass powder, and these components were mixed in a mixed solvent consisting of ethanol and water with a ball mill for 40 hours to give a slurry of a matrix material. Thereafter, a prepreg sheet was prepared in the same manner as in Referential Example 3.

The above prepreg sheet was cut to square pieces having a size of 5 cm × 5 cm, and the square pieces were stacked in a graphite die to which colloidal carbon had been applied as a die-releasing agent, and hot-pressed in an argon atmosphere at a temperature of 1,100° to 1,150° C. at a pressure of 50 kg/cm$^2$. Then, the pressure was decreased back to atmospheric pressure, and the hot-pressed product was heat-treated at 1,250° C. for 1 hour for crystallization of the matrix to give an inorganic fiber-reinforced composite material containing glass ceramic as a matrix. The proportion of the inorganic fiber in the composite material was 45% by volume, and the crystal phase in the matrix comprised cordierite and cristobalite.

The above-obtained composite material had a flexural strength, measured at room temperature, of 80 kg/mm$^2$ and a fracture toughness value of 18 MPa·m$^{\frac{1}{2}}$.

What is claimed is:

1. An inorganic fiber composed of
   (1) an amorphous substance composed of silicon, carbon, either titanium or zirconium, and oxygen,
   (2) an aggregate composed of;
      (a) crystalline fine particles formed of at least one member selected from the group consisting of β-SiC, MC, a solid solution of β-SiC and MC, and MC$_{1-x}$, and having a particle diameter of not more than 50 nm,
      (b) amorphous SiO$_2$, and
      (c) MO$_2$, or
   (3) a mixture of the amorphous substance (1) with the aggregate (2),
   wherein M is titanium or zirconium and x is greater than 0 and less than 1,
   the inorganic fiber having an inner layer portion comprising 40 to 60% by weight of silicon, 20 to 40% by weight of carbon, 0.5 to 10% by weight of titanium or zirconium and 10 to 30% by weight of oxygen, and a surface layer portion comprising 0 to 40% by weight of silicon, 50 to 100% by weight of carbon, 0 to 8% by weight of titanium or zirconium and 0 to 25% by weight of oxygen, the surface layer portion having a depth of not more than 500 nm from the inorganic fiber surface and having a gradient distribution of carbon in which the carbon content gradually increases toward the inorganic fiber surface.

2. An inorganic fiber according to claim 1, wherein the surface layer portion has a composition distribution portion formed entirely of carbon.

3. A process for producing the inorganic fiber recited in claim 1, which comprises spinning a fiber from polytitanocarbosilane or polyzirconocarbosilane, rendering the fiber infusible, and introducing the infusible fiber into and moving said fiber through a continuous furnace having a temperature gradient in the direction in which the infusible fiber moves to pyrolyze the infusible fiber at a final pyrolysis temperature in the range of 800° to 2,000° C. in an inert gas atmosphere or under vacuum.

4. A process according to claim 3, wherein the temperature gradient is stepwise or continuous.

5. A process according to claim 3, wherein the temperature gradient is 50° to 1,000° C. per meter of furnace length.

6. A process according to claim 3, wherein the infusible fiber is pyrolyzed under tension.

* * * * *

UNITED STATES PATENT AND TRADEMARK OFFICE
CERTIFICATE OF CORRECTION

PATENT NO. : 5,240,888
DATED      : August 31, 1993
INVENTOR(S): TAKEMI YAMAMURA, TOSHIHIRO ISHIKAWA AND MASAKI SHIBUYA It is certified that error appears in the above-identified patent and that said Letters Patent is hereby corrected as shown below:

Column 10, lines 64 and 65, delete "has a composition distribution portion formed" and insert therefor --is composed--.

Signed and Sealed this

Second Day of August, 1994

Attest:

BRUCE LEHMAN

Attesting Officer

Commissioner of Patents and Trademarks